United States Patent [19]

Slechta, Jr.

[11] Patent Number: 4,482,983
[45] Date of Patent: Nov. 13, 1984

[54] VARIABLE SPEED CYCLE TIME FOR SYNCHRONOUS MACHINES

[75] Inventor: Leo J. Slechta, Jr., Rosemount, Minn.

[73] Assignee: Sperry Corporation, New York, N.Y.

[21] Appl. No.: 541,488

[22] Filed: Oct. 13, 1983

Related U.S. Application Data

[63] Continuation of Ser. No. 161,987, Jun. 23, 1980.

[51] Int. Cl.³ .............................................. G06F 1/00
[52] U.S. Cl. ................................................... 364/900
[58] Field of Search ............................... 364/200, 900

[56] References Cited

U.S. PATENT DOCUMENTS

| | | | |
|---|---|---|---|
| 3,656,123 | 4/1972 | Carnevale et al. | 364/200 |
| 3,728,635 | 4/1973 | Eisenberg | 328/48 |
| 4,028,663 | 6/1977 | Royer et al. | 364/900 |
| 4,231,104 | 10/1980 | St. Clair | 364/900 |

Primary Examiner—Gareth D. Shaw
Assistant Examiner—T. A. Wiens
Attorney, Agent, or Firm—William C. Fuess; Kenneth T. Grace; Marshall M. Truex

[57] ABSTRACT

Apparatus for and method of providing a variable speed cycle time for synchronous machines. The synchronous machine performs a number of functions, wherein the execution time for a given function is dependent upon the input quantities. Timing for the input dependent function is divided into fixed and variable sequences. A synchronous counter is loaded with a quantity representative of the input quantities. The synchronous counter then controls the duration of the variable sequences based upon the representative quantity. Since it is clocked by the system clock, the synchronous counter controls the variable sequences synchronously with the controlling of the fixed sequences.

4 Claims, 15 Drawing Figures

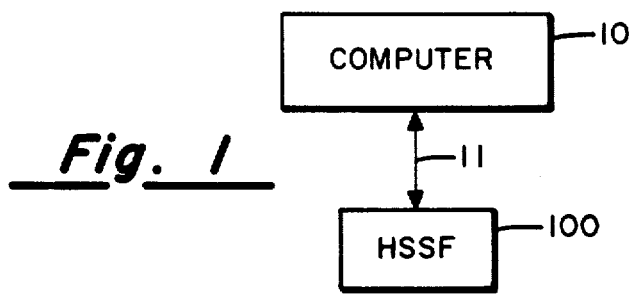
Fig. 1
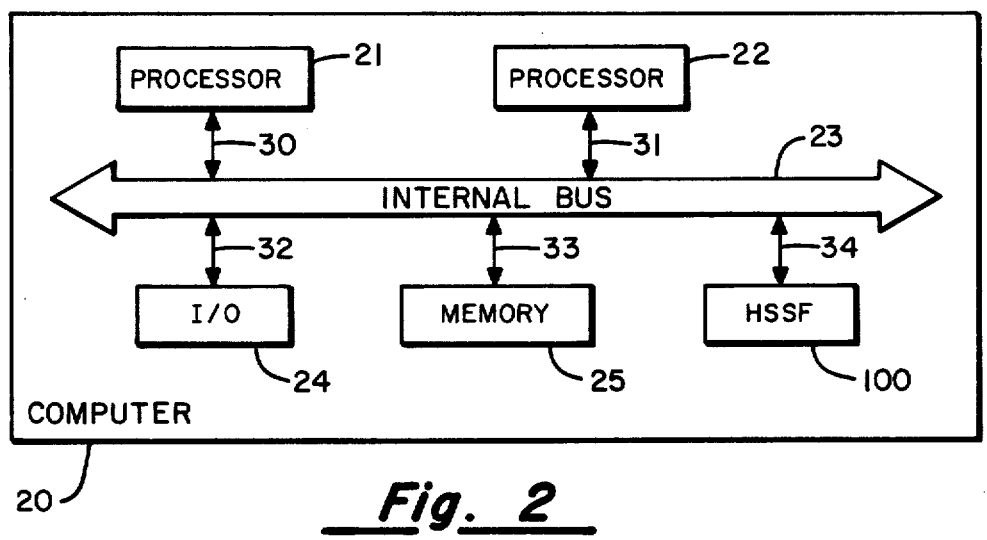
Fig. 2
| OPERANDS IN BOOLEAN EXPRESSION ||
|---|---|
| NUMBER | INCREMENT |
| 1 - 10 | 0 |
| 11 - 15 | 1 |
| 16 - 20 | 2 |
| 21 - 25 | 3 |
| 26 - 30 | 4 |
| 31 - 32 | 5 |
Fig. 13

| MAX FIELD WIDTH (BYTES) | OPERANDS IN BOOLEAN EXPRESSION | | | | | |
|---|---|---|---|---|---|---|
| | 1-10 | 11-15 | 16-20 | 21-25 | 26-30 | 31-32 |
| 1-11 | 1.00 | 1.25 | 1.50 | 1.75 | 2.00 | 2.25 |
| 12-14 | 1.25 | 1.25 | 1.50 | 1.75 | 2.00 | 2.25 |
| 15-17 | 1.50 | 1.50 | 1.50 | 1.75 | 2.00 | 2.25 |
| 18-21 | 1.75 | 1.75 | 1.75 | 1.75 | 2.00 | 2.25 |
| 22-24 | 2.00 | 2.00 | 2.00 | 2.00 | 2.00 | 2.25 |
| 25-27 | 2.25 | 2.25 | 2.25 | 2.25 | 2.25 | 2.25 |
| 28-30 | 2.50 | 2.50 | 2.50 | 2.50 | 2.50 | 2.50 |
| 31-33 | 2.75 | 2.75 | 2.75 | 2.75 | 2.75 | 2.75 |
| 34-36 | 3.00 | 3.00 | 3.00 | 3.00 | 3.00 | 3.00 |
| 37-39 | 3.25 | 3.25 | 3.25 | 3.25 | 3.25 | 3.25 |
| 40-42 | 3.50 | 3.50 | 3.50 | 3.50 | 3.50 | 3.50 |
| 43-46 | 3.75 | 3.75 | 3.75 | 3.75 | 3.75 | 3.75 |
| 47-49 | 4.00 | 4.00 | 4.00 | 4.00 | 4.00 | 4.00 |
| 50-52 | 4.25 | 4.25 | 4.25 | 4.25 | 4.25 | 4.25 |
| 53-55 | 4.50 | 4.50 | 4.50 | 4.50 | 4.50 | 4.50 |
| 56-58 | 4.75 | 4.75 | 4.75 | 4.75 | 4.75 | 4.75 |

*Fig. 6*     ALL TIMES IN MICROSECONDS

DELAY TIME = T · (178 − N)
WHERE T = SYSTEM CLOCK PERIOD
N = CONTENTS OF DELAY REG

| MAXIMUM FIELD WIDTH ||
|---|---|
| WIDTH | INCREMENT |
| 1-11 | 0 |
| 12-14 | 1 |
| 15-17 | 2 |
| 18-21 | 3 |
| 22-24 | 4 |
| 25-27 | 5 |
| 28-30 | 6 |
| 31-33 | 7 |
| 34-36 | 8 |
| 37-39 | 9 |
| 40-42 | 10 |
| 43-46 | 11 |
| 47-49 | 12 |
| 50-52 | 13 |
| 53-55 | 14 |
| 56-58 | 15 |

*Fig. 14*

| CYCLE TIME |||
|---|---|---|
| TOTAL INCREMENT | CONTENTS OF DELAY REG 264 | TIME (microseconds) |
| 0 | 15 | 1.00 |
| 1 | 14 | 1.25 |
| 2 | 13 | 1.50 |
| 3 | 12 | 1.75 |
| 4 | 11 | 2.00 |
| 5 | 10 | 2.25 |
| 6 | 9 | 2.50 |
| 7 | 8 | 2.75 |
| 8 | 7 | 3.00 |
| 9 | 6 | 3.25 |
| 10 | 5 | 3.50 |
| 11 | 4 | 3.75 |
| 12 | 3 | 4.00 |
| 13 | 2 | 4.25 |
| 14 | 1 | 4.50 |
| 15 | 0 | 4.75 |

VARIABLE SPEED CYCLE TIME FOR SYNCHRONOUS MACHINES

This is a continuation of Ser. No. 161,987, filed June 23, 1980.

BACKGROUND OF THE INVENTION

The present invention relates generally to circuits for controlling sequential machines and relates more specifically to variable speed, synchronous, digital clocks.

Most sequential machines are controlled by clocks having a period which is fixed for each function to be performed. The normal design practice is to select a clock period sufficient for execution time using the worst case input conditions. This means that the function is performed at a fixed speed. This is particularly disadvantageous for machines having variable length operands. Either the length of operands must be limited to a narrow range or each execution of a function must proceed at no faster than the worst case execution time.

SUMMARY OF THE INVENTION

The present invention is used to provide a variable but synchronous cycle time for certain processing functions whose execution time is determined by its input quantities. A delay register is loaded with a quantity determined by the input quantities for a given, variable execution time function. The cycle is divided into variable and fixed length sequences. During the variable length sequences, a delay counter is loaded with the contents of the delay register. The delay counter is incremented using the master system clock. The delay counter overflow determines the end of the variable length sequences. The delay counter carry output is used to signal the end of the variable length sequences. Because the delay counter is a synchronous counter (i.e., clock by the master system clock), the variable length sequences will always be synchronous (i.e., a proper multiple of the master clock period).

BRIEF DESCRIPTION OF THE DRAWINGS

FIG. 1 shows a block diagram of the High Speed Search Function (HSSF) in an outboard configuration.

FIG. 2 shows a block diagram of the HSSF in an inboard configuration.

FIG. 6 shows execution time of the HSSF as a function of the input quantities.

FIG. 13 shows the increment as a function of the number of operands in Boolean Expression.

FIG. 14 shows the increment as a function of the Maximum Field Width.

FIG. 15 shows the cycle time as a function of total increment.

DESCRIPTION OF THE PREFERRED EMBODIMENT

The preferred embodiment is employed in the High Speed Search Function (HSSF) product of the assignee of this invention. Those skilled in the art will readily see the application of the present invention to other synchronous machines.

Below is a brief description of the HSSF used to disclose the present invention. Should the reader desire a more detailed description, copending U.S. patent applications entitled, High Speed Data Base Search System, Ser. No. 161,993, and Variable Search Criteria, Ser. No. 161,983, should be consulted.

The HSSF is a special purpose processor used to efficiently perform complex searches within a data base. The HSSF is loaded by the host processor with the search criteria and the data base to be searched. The HSSF performs the programmed function asynchronous to the host processor and notifies the host processor upon completion. FIG. 1 shows the HSSF in an outboard configuration. COMPUTER 10 is the host processor. The HSSF is employed in a stand-alone mode and communicates with COMPUTER 10 via Input/Output cable 11. In this outboard configuration, COMPUTER 10 handles HSSF 100 as if it were a peripheral device.

FIG. 2 shows HSSF 100 in an inboard configuration. HSSF 100 is a part of COMPUTER 20. HSSF 100 communicates with PROCESSOR 21 and 22, I/O 24, and MEMORY 25 via INTERNAL BUS 23. This is the preferred mode for most applications, since INTERNAL BUS 23 typically permits faster communication than INPUT/OUTPUT Cable 11 (see also FIG. 1).

Figure 3:
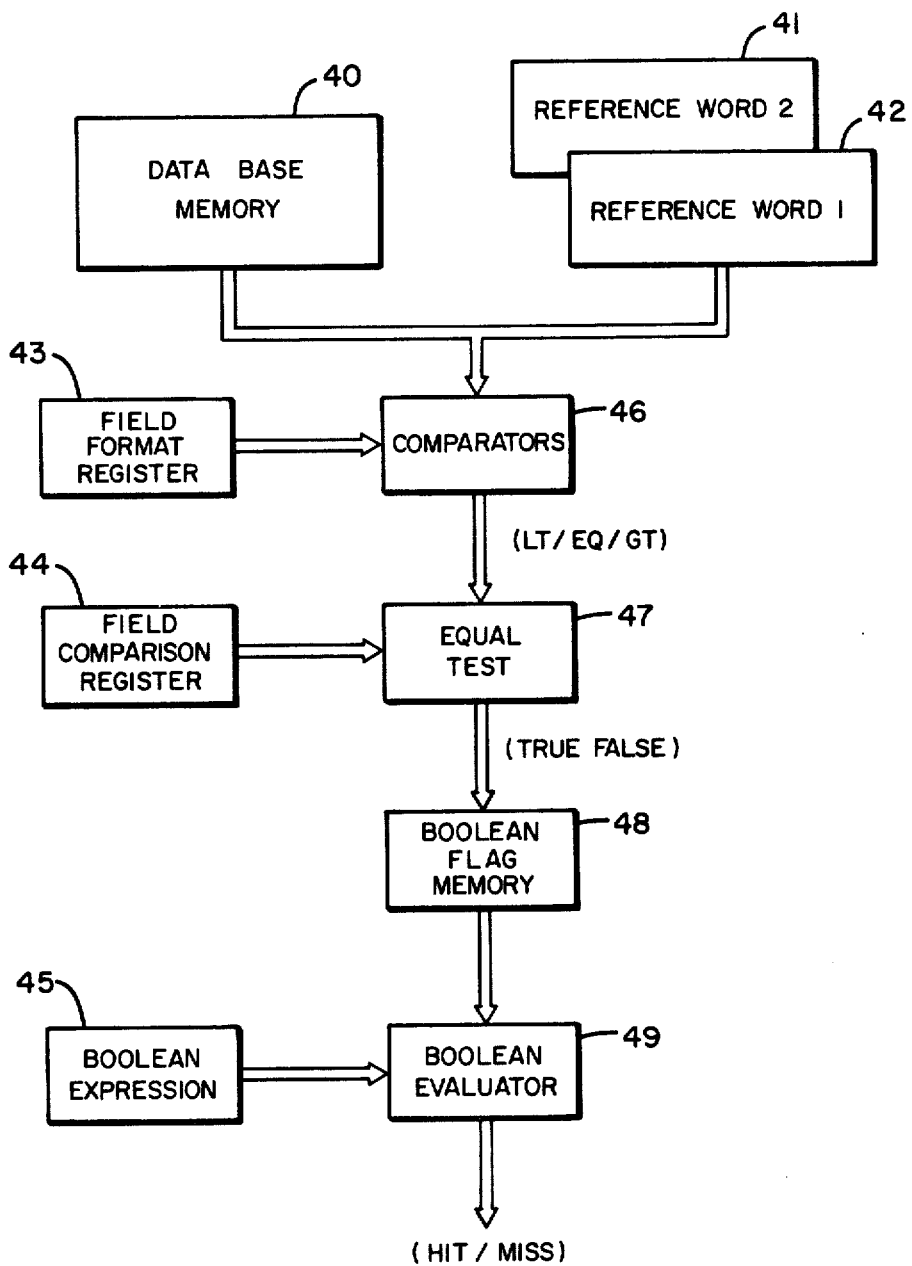
FIG. 3 shows the functions of the HSSF.

FIG. 3 shows the overall operation of HSSF 100. DATA BASE MEMORY 40 is loaded under Command from the host processor with the data base to be searched. FIELD FORMAT REGISTER 43 is loaded to describe the length of each of the fields within each record in the data base. Notice that this feature makes HSSF very flexible in that a given field may be one or many bytes in length. This feature also requires a variable cycle time, such searches of very large fields cause delays in propagating carries whereas only small delays are encountered for small fields.

REFERENCE WORD 1 42 and REFERENCE WORD 2 41 are each one record in length and are formatted in the same way (i.e., described by FIELD FORMAT REGISTER 43) as the data base in DATA BASE MEMORY 40. Two reference words are used for a "range compare" (e.g., within bounds of two references, without bounds of two references, etc.). Only REFERENCE WORD 1 42 is used for "normal" compares (e.g., less than, equal, greater than, reference).

COMPARATORS 46 compare each field (as defined in FIELD FORMAT REGISTER 43) of the reference words to the corresponding fields of each record from DATA BASE MEMORY 40. The resultant output of COMPARATOR 46 consists of less than, equal, and greater than indications for each field. FIELD COMPARISON REGISTER 44 is loaded with a field-by-field description of the search criteria (i.e., which fields should be less than, which fields should be equal, and which fields should be greater than). EQUAL TEST 47 makes a field-by-field determination of whether a comparison matches (i.e., is true) or does not match (i.e., is false) the corresponding search criterion.

BOOLEAN FLAG MEMORY 48 stores the True/False indications on a field-by-field basis. BOOLEAN EXPRESSION 45 is also supplied by the host processor. It defines the logical relationships of the field-by-field True/False indications which produce search "hits and misses." The logical computation is performed by BOOLEAN EVALUATOR 49. The number of terms in BOOLEAN EXPRESSION 45 may be many or few depending upon the search task to be performed. BOOLEAN EVALUATOR 49 requires an increasing amount of time as the number of terms is increased. BOOLEAN EVALUATOR 49 produces a simple HIT/MISS Output which is correlated with the record number (or address of the record in DATA BASE MEMORY 40). This correlation permits identification of hits (or misses).

Figure 4:
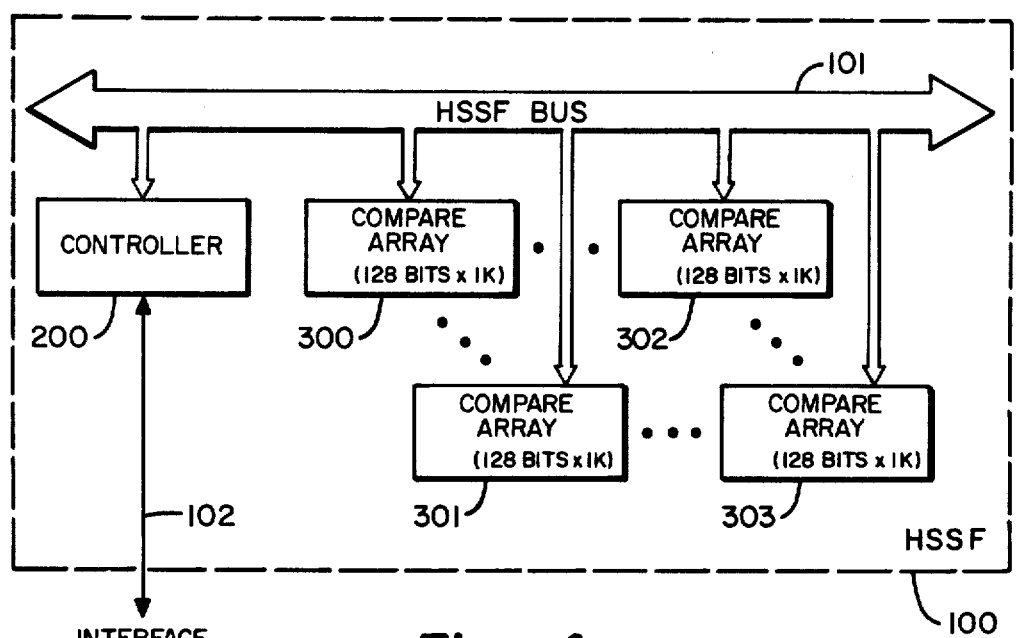
FIG. 4 shows a block diagram of the HSSF.

FIG. 4 shows a block diagram of HSSF 100. HSSF BUS 101 provides the communication path between CONTROLLER 200 and COMPARE ARRAY 300, . . ., 301, . . ., 302, . . ., and 303. COMPARE ARRAY 300 contains 128 bits×1,000 addressable locations of the DATA BASE MEMORY 40. For a larger record size, identical COPARE ARRAYS are added in the dimension of COMPARE ARRAY 302. The intention is to add sufficient COMPARE ARRAYS in that dimension to permit the maximum size record to be stored in a single addressable location. As more records are added to the data base, COMPARE ARRAYS are added in the dimension of COMPARE ARRAY 301. This provides sufficient addressable locations to store all records of the maximum size file in HSSF 100. Each COMPARE ARRAY contains all the logic to perform the actual comparisons. In the preferred embodiment, each COMPARE ARRAY is a separate, plug-in printed circuit module.

Figure 5:
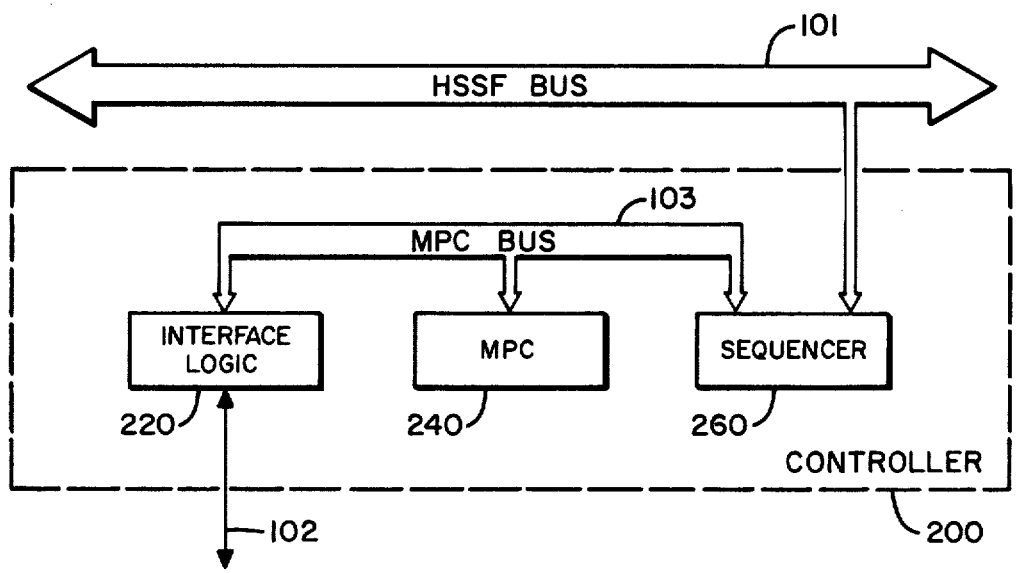
FIG. 5 shows a block diagram of CONTROLLER 200.

CONTROLLER 200 contains all of the sequencing logic to control the COMPARE ARRAYS. CONTROLLER 200 communicates with the host processor via cable 102, INTERFACE. FIG. 5 shows a block diagram of CONTROLLER 200. INTERFACE LOGIC 220 is the only element which changes from the outboard to the inboard configuration. The microprogrammed controller, MPC 240, provides the control for INTERFACE LOGIC 220. SEQUENCER 260 contains the circuitry which controls the COMPARE ARRAYS's via HSSF BUS 101. MPC BUS 103 supplies the communication path amongst INTERFACE LOGIC 220, MPC 240, and SEQUENCER 260.

FIG. 6 shows the time required to perform a normal (i.e., single reference word) search of one record as a function of Maximum Field Width (i.e., field having the greatest number of bytes) and the number of Operands in the Boolean Expression. All times shown are in microseconds. Notice that to use only a fixed length cycle would force a very long cycle time (i.e., 4.75 microseconds), a small maximum field width (1-11 bytes) and small number of operands (1-10) in the Boolean Expression, or a compromise somewhere in between.

Figure 7:
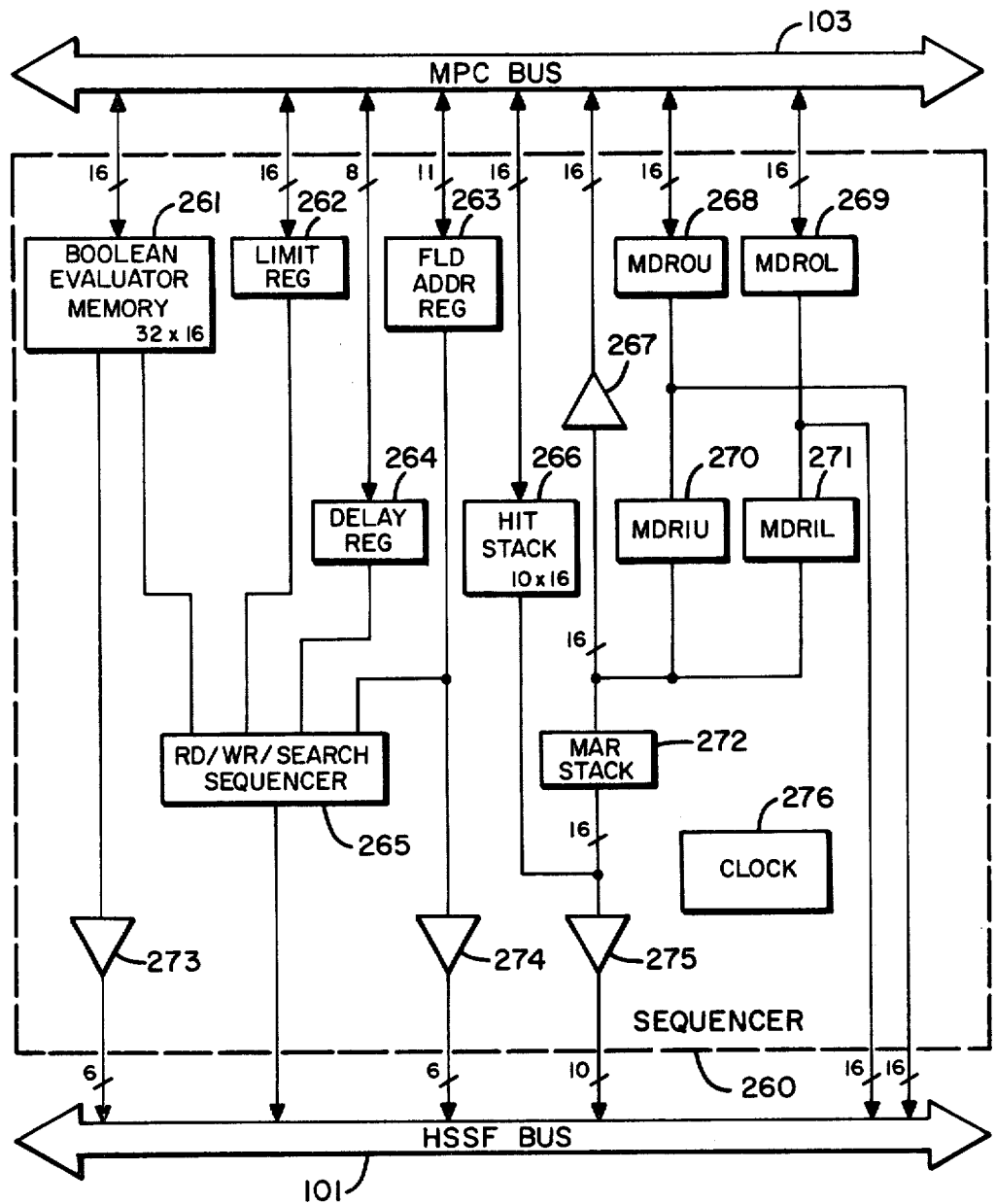
FIG. 7 shows a block diagram of SEQUENCER 260.

FIG. 7 shows a block diagram of SEQUENCER 260. As stated above, SEQUENCER 260 controls the operation of the COMPARE ARRAYS. The Memory Data Register has an input circuit (i.e., MDRIU 270 and MDRIL 271) and an output circuit (i.e., MDROU 268 and MDROL 269). The Memory Data Register supplies the primary interface between MPC BUS 103 and HSSF BUS 101 for loading the COMPARE ARRAY's CLOCK 276 provides overall synchronization within the HSSF 100. BOOLEAN EVALUATOR MEMORY 261 is wherein the Boolean Evaluation is performed.

Of most concern to present invention are DELAY REG 264 and RD/WR/SEARCH SEQUENCER 265. DELAY REG 264 is loaded from MPC BUS 103 with an eight bit byte. FIG. 6 shows that only 16 different timing values are required (i.e., from 1.0 to 4.75 microseconds in 0.25 microsecond increments). Therefore, only four bits of DELAY REG 264 are required to specify the 16 different cycle times. Referring again to FIG. 7, DELAY REG 264 is loaded from MPC BUS 103. RD/WR/SEARCH SEQUENCER 265 determines the actual cycle time for a given search.

Figure 8:
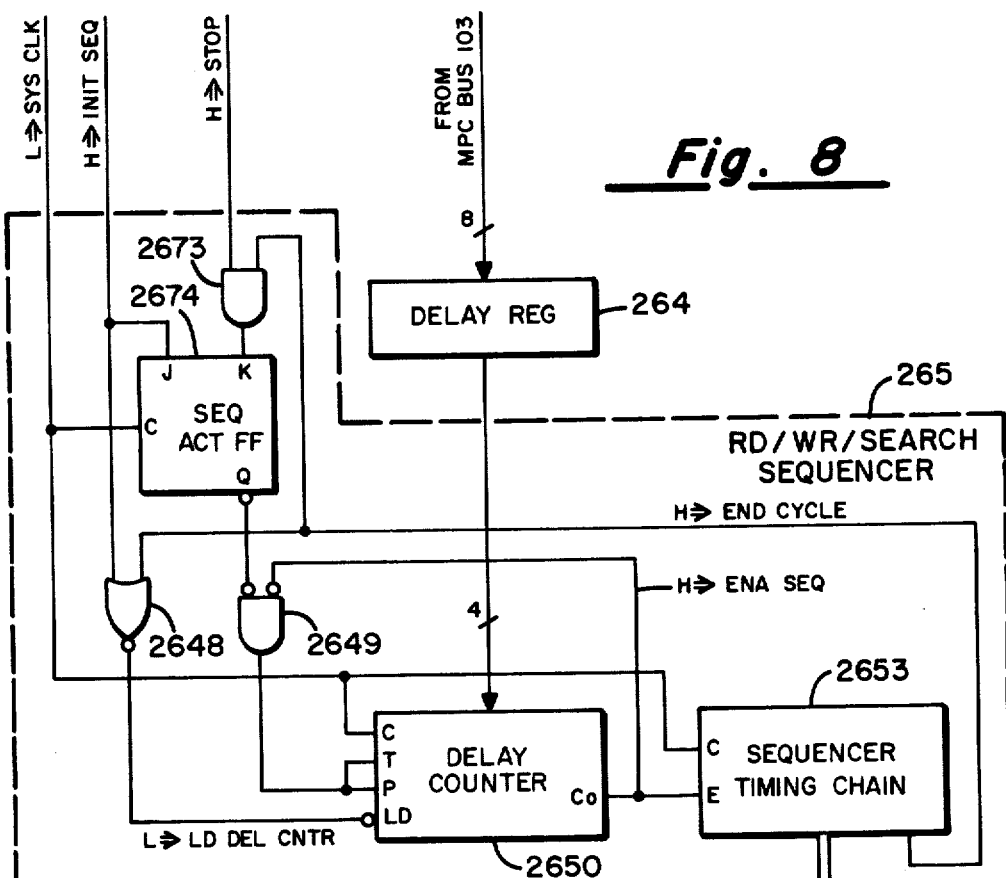
FIG. 8 shows a block diagram of the preferred embodiment of the present invention.

FIG. 8 shows the circuitry which determines the variable cycle time. DELAY REG 264 receives an eight bit quantity from MPC BUS 103. As explained above only four bits are required to specify the 16 different cycle times available. This four bit quantity is determined by MPC 240 and transferred to DELAY REG 264. To determine the four bit quantity, MPC 240 adds a first increment based upon the number of Operands in the Boolean Expression to a second increment representing the Maximum Field Width. FIG. 13 shows the value of the first increment based upon the number of Operands in the Boolean Expression. FIG. 14 shows the second increment as a function of the Maximum Field Width. MPC 240 computes these two increments from the search parameters supplied by the host processor, and stores the compliment of the larger of the two increments in DELAY REG 264.

Referring again to FIG. 8, DELAY COUNTER 2650 is loaded with the contents of DELAY REG 264 whenever signal LD DEL CNTR (i.e., low) is received from gate 2648. This signal is generated whenever signal INIT SEQ (i.e., high) is received or signal END CYCLE (i.e., high) is received from SEQUENCER TIMING CHAIN 2653. Once loaded, DELAY COUNTER 2650 is incremented by signal SYS CLK (i.e., system master clock) whenever enabled by gate 2649. Gate 2649 enables DELAY COUNTER 2650 for counting whenever JK Flip Flop, SEQ ACT 2674, is set and output Co of DELAY COUNTER 2650 is low (i.e., Signal ENA SEQ not present).

DELAY COUNTER 2650, after being loaded and enabled, synchronously counts until overflow (i.e. $17_8$) making output Co high. DELAY COUNTER 2650 is no longer incremented and SEQUENCER TIMING CHAIN 2653 is enabled (i.e., has a high on input E). SEQUENCER TIMING CHAIN 2653, after being enabled, supplies the SEQUENCER CONTROL SIGNALS which represent the fixed length portion of the cycle.

Figure 9:
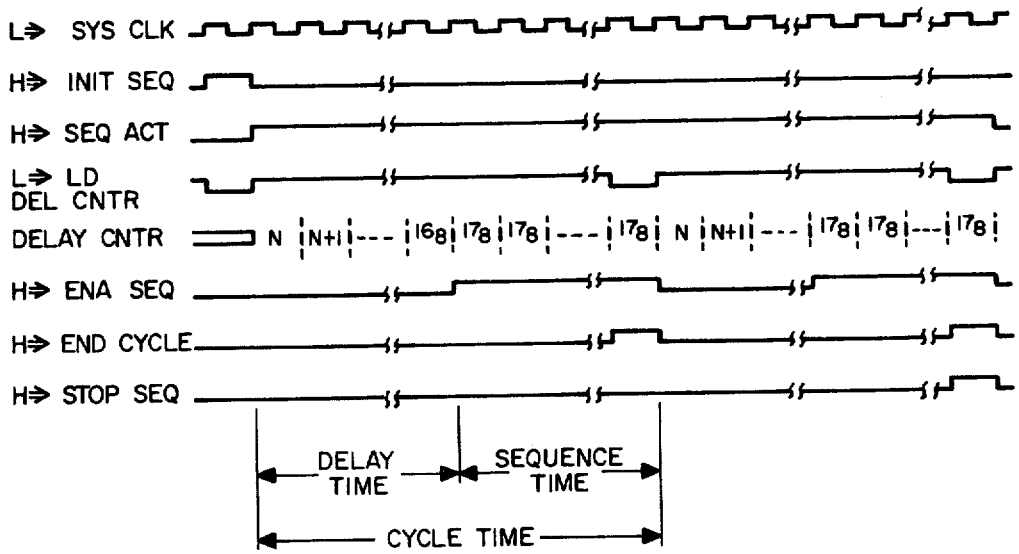
FIG. 9 shows the timing of the preferred embodiment of the present invention.

FIG. 9 shows the key timing relationships. The Cycle Time is divided into the variable length time, called DELAY TIME, and the fixed length time, called SEQUENCE TIME. The master system clock, in the preferred embodiment is a four mhz clock having a period of 0.25 microseconds. The contents of DELAY COUNTER 2650 are shown. FIG. 15 shows the relationship between the contents of DELAY REG 264 and the total cycle time. Notice that SEQUENCE TIME is fixed at 1.0 microsecond.

Figure 10:
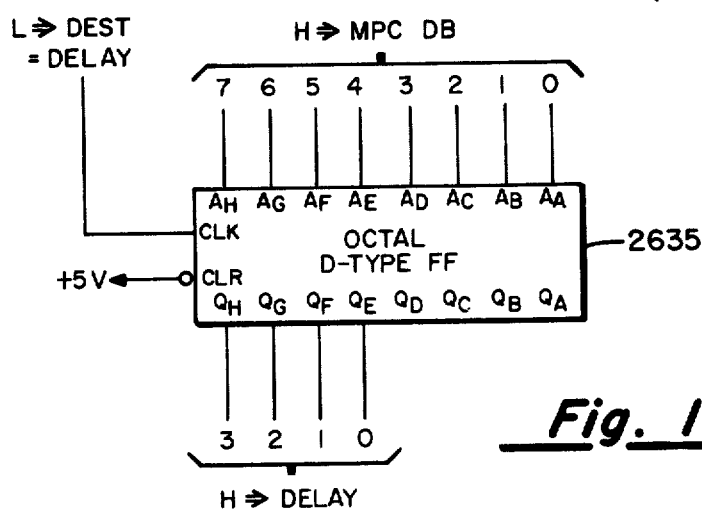
FIG. 10 shows the detailed construction of DELAY REG 264.
Figure 12:
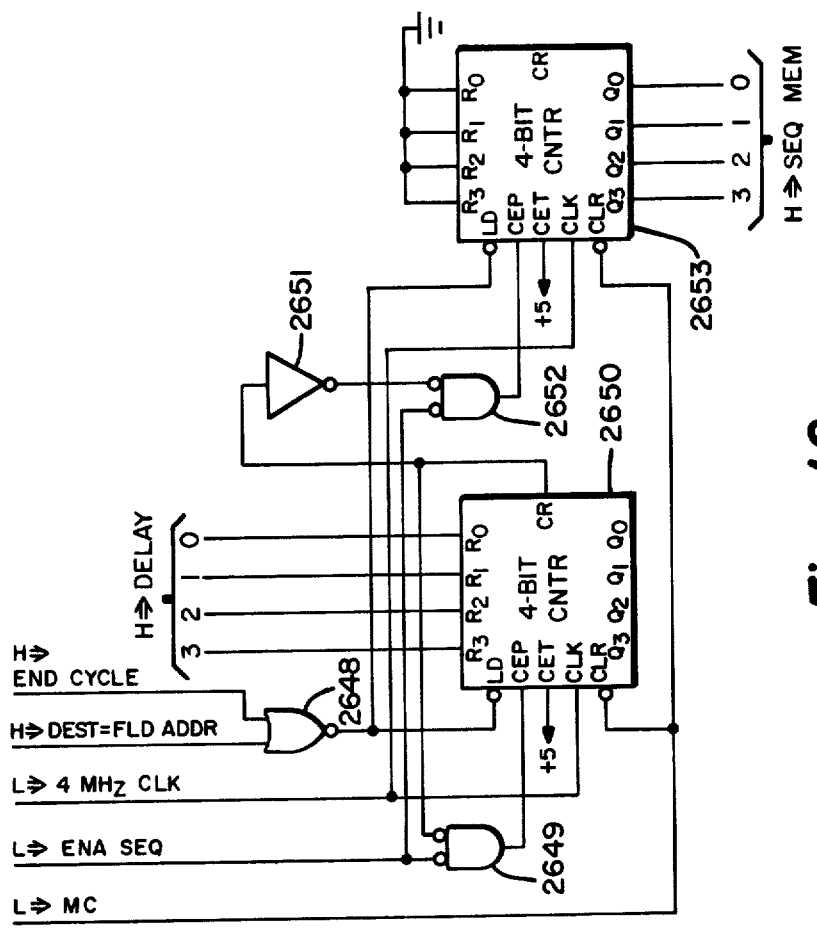
FIG. 12 shows DELAY COUNTER 2650 and SEQUENCER TIMING CHAIN 2653.
Figure 11:
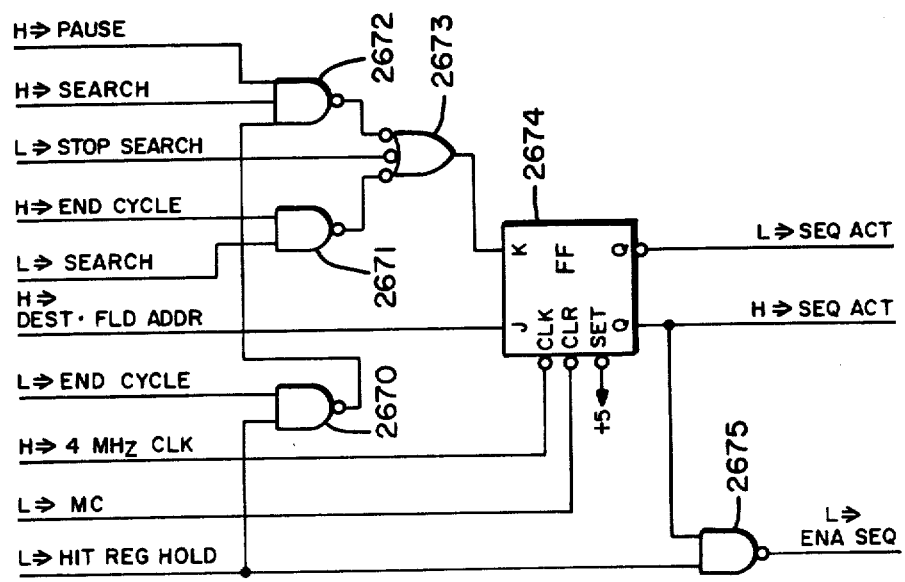
FIG. 11 shows the detailed construction of the control circuitry for DELAY COUNTER 2650.

FIG. 10 shows the detailed construction of DELAY REG 264. In the preferred embodiment, OCTAL D—TYPE FF 2635 is industry standard part 54LS273. FIG. 11 shows the detailed construction of SEQ ACT 2674 which is a JK Flip Flop of part type 54LS412. FIG. 12 shows DELAY COUNTER 2650 and SEQUENCER TIMING CHAIN 2653. Notice that each is implemented using a standard 4-BIT Synchronous Counter type 54LS161.

The preferred embodiment of the present invention is disclosed as implemented within the High Speed Search Function product. Those skilled in this art will be able to readily apply this invention to other synchronous machines.

What is claimed is:

1. A timing chain signal generating apparatus responsive to reference clock pulses for, in a cyclically continuous manner, firstly not generating timing chain signals during a DELAY TIME interval of variable time duration and then, secondly, generating a plurality of timing chain signals during a SEQUENCE TIME interval of fixed time duration, said apparatus for not generating timing chain signals for an interval of variable time duration and for then generating timing chain signals for an interval of fixed time duration comprising:
   counter means responsive to received said reference clock pulses for counting from a number quantity to a predetermined value;
   loading means coupled to said counter means for loading said counter means with a number quantity corresponding to a desired said DELAY TIME interval;
   sequencer timing chain means receiving said reference clock pulses for generating responsively thereto while enabled a plurality of timing chain signals;
   clock means for providing said reference clock pulses; and
   control means coupled to said counter means and said sequencer timing chain means for, in continuous cyclical sequence,
   firstly causing that said counter means is loaded with said number quantity by said loading means, and then
   secondly, upon said counter means having counted from said number quantity to a predetermined value, causing that said sequencer timing chain means is enabled for generating said timing chain signals, and then
   thirdly, after said generating said timing chain signals has transpired for a fixed number, said plurality, of said timing chain signals, which SEQUENCE TIME interval is thus of fixed time duration, causing that said counter means is reloaded with said number quantity by said loading means;
   whereby said sequencer timing chain means is not enabled for generating said timing chain signals until said counter means has counted, responsively to said reference clock pulses, from said number quantity which was loaded within said counter means to a predetermined value, thus said sequencer timing chain means is not enabled for generating said timing chain signals until an interval of variable time duration, which variable time duration is dependent upon said number quantity, has transpired;
   whereby said sequencer timing chain is enabled for generating said timing chain signals until said fixed number, said plurality, of said timing chain signals have been generated, which, because said timing chain signals are generated responsively to said reference clock pulses, means that said sequencer timing chain is enabled for generating said timing chain signals for a fixed number of said reference clock pulses, ergo for an interval of fixed time duration.

2. An apparatus according to claim 1 wherein said counter means further comprises:
   counter means for synchronously incrementing responsively to received reference clock pulses; wherein said loading means further comprises:
   loading means coupled to said counter means for loading said counter means with a number quantity which number quantity is the additive inverse of a value linearly proportional to desired said variable DELAY TIME interval; and wherein said control means further comprises:
   control means for secondly, upon said counter means having incremented from said number quantity to a predetermined value which value corresponds to a maximum said DELAY TIME interval, causing that said sequencer timing chain means is enabled for said generating said timing chain signals.

3. The timing chain generating apparatus of claim 1 which further comprises:
   commanding means for supplying an initiate signal, for supplying as desired across the times of operation plural of said number quantity, each which number quantity does correspond to a desired said variable DELAY time interval; wherein said loading means further comprises:
   loading means responsively coupled to said commanding means for receiving a current number quantity into said counter means, which said current quantity corresponds to a currently desired said variable DELAY TIME interval; and wherein said control means further comprises:
   control means responsively coupled to said commanding means for performing said causing in said continuous sequence from said initiate signal to said stop signal.

4. The timing chain generating apparatus of claim 1 wherein said sequencer timing chain means further comprises:
   sequencer timing chain means receiving said reference clock pulses for generating responsively thereto while enabled a plurality of timing chain signals which are a binary encoded count of received said reference clock pulses.

* * * * *